United States Patent
Benisty et al.

(10) Patent No.: US 11,650,937 B2
(45) Date of Patent: May 16, 2023

(54) STORAGE SYSTEM AND METHOD FOR SECURE HOST CONTROLLER MEMORY BUFFER ACCESS

(71) Applicant: Western Digital Technologies, Inc., San Jose, CA (US)

(72) Inventors: Shay Benisty, Beer Sheva (IL); Rajesh Koul, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 37 days.

(21) Appl. No.: 16/731,590

(22) Filed: Dec. 31, 2019

(65) Prior Publication Data
US 2021/0200689 A1 Jul. 1, 2021

(51) Int. Cl.
| | |
|---|---|
| G06F 12/14 | (2006.01) |
| G06F 12/02 | (2006.01) |
| G06F 13/16 | (2006.01) |
| G06F 9/455 | (2018.01) |
| G06F 3/06 | (2006.01) |
| G06F 9/54 | (2006.01) |
| G06F 12/0882 | (2016.01) |

(52) U.S. Cl.
CPC ........ *G06F 12/1458* (2013.01); *G06F 3/0622* (2013.01); *G06F 3/0637* (2013.01); *G06F 3/0659* (2013.01); *G06F 3/0679* (2013.01); *G06F 9/45558* (2013.01); *G06F 9/544* (2013.01); *G06F 9/546* (2013.01); *G06F 12/0246* (2013.01); *G06F 12/0882* (2013.01); *G06F 13/1642* (2013.01); *G06F 13/1673* (2013.01); *G06F 2009/45579* (2013.01)

(58) Field of Classification Search
None
See application file for complete search history.

(56) References Cited

U.S. PATENT DOCUMENTS

| | | |
|---|---|---|
| 6,260,120 B1 | 7/2001 | Blumenau et al. |
| 9,003,071 B2 | 4/2015 | Liu |
| 9,268,717 B2 | 2/2016 | Kanigicherla et al. |
| 10,387,078 B1 | 8/2019 | Benisty |
| 10,740,243 B1 * | 8/2020 | Benisty ............... G06F 3/0659 |
| 10,936,420 B1 * | 3/2021 | Kotzur ............... G06F 11/1096 |
| 11,314,635 B1 * | 4/2022 | Volpe ................. G06F 11/3476 |

(Continued)

OTHER PUBLICATIONS

"NVM Express over Fabrics." Jun. 2016. Rev. 1.0. pp. 39-40.*

(Continued)

*Primary Examiner* — Nathan Sadler
(74) *Attorney, Agent, or Firm* — Crowell & Moring LLP (57) ABSTRACT

A storage system and method for secure host controller memory buffer access are provided. In one embodiment, a storage system is provided comprising a storage area configured to store a database comprising a submission queue and a completion queue dedicated for use by an authorized host, and a controller. The controller is configured to: receive a request to access the storage area; determine whether the request is from the authorized host or from an unauthorized host; in response to determining that the request is from the authorized host, grant the request; and in response to determining that the request is from an unauthorized host, deny the request. Other embodiments are provided.

20 Claims, 9 Drawing Sheets

(56) References Cited

U.S. PATENT DOCUMENTS

| | | | |
|---|---|---|---|
| 2004/0236876 A1 | 11/2004 | Kondratiev et al. | |
| 2008/0162784 A1 | 7/2008 | Obereiner et al. | |
| 2014/0201419 A1 | 7/2014 | Ayzenfeld et al. | |
| 2014/0325013 A1* | 10/2014 | Tamir | G06F 3/0611 709/212 |
| 2015/0317088 A1* | 11/2015 | Hussain | G06F 9/50 711/103 |
| 2016/0098372 A1* | 4/2016 | Boyle | G06F 13/4282 710/313 |
| 2017/0024166 A1 | 1/2017 | Singh et al. | |
| 2017/0102874 A1 | 4/2017 | Ouchi et al. | |
| 2017/0371809 A1 | 12/2017 | Benedict | |
| 2018/0260145 A1* | 9/2018 | Margetts | G06F 13/1668 |
| 2018/0321987 A1* | 11/2018 | Benisty | G06F 9/528 |
| 2020/0042246 A1* | 2/2020 | Maharana | G06F 3/0604 |
| 2020/0310682 A1* | 10/2020 | Benisty | G06F 13/1642 |
| 2021/0004165 A1* | 1/2021 | Benisty | G06F 3/0673 |

OTHER PUBLICATIONS

Stephen Bates. "Important new NVMe features for optimizing the data pipeline." Aug. 2018. Flash Memory Summit, https://www.flashmemorysummit.com/English/Collaterals/Proceedings/2018/20180808_SOFT-201-1_Bates.pdf.*

NVM Express. Nov. 2014. NVM Express. Rev. 1.2. pp. 56-60.*

International Search Report dated Sep. 16, 2020 for International Application No. PCT/US2020/024861.

Written Opinion dated Sep. 16, 2020 for International Application No. PCT/US2020/024861.

* cited by examiner

STORAGE SYSTEM AND METHOD FOR SECURE HOST CONTROLLER MEMORY BUFFER ACCESS

BACKGROUND

Non-Volatile Memory Express (NVMe) is a standard for accessing non-volatile storage media attached via a Peripheral Component Interconnect Express (PCIe) bus. NVMe may be used with a variety of non-volatile storage media, such as solid state drives (SSDs). One focus of NVMe relates to input/output communication between a host device (which may access and/or write to the non-volatile storage media) and a storage system (which includes the non-volatile storage media).

DETAILED DESCRIPTION

Overview

By way of introduction, the below embodiments relate to a storage system and method for secure host controller memory buffer access, which can be used, for example, in a Non-Volatile Memory Express (NVMe) virtualization system. In one embodiment, a storage system is provided comprising a storage area configured to store a database comprising a submission queue and a completion queue dedicated for use by an authorized host, and a controller. The controller is configured to: receive a request to access the storage area; determine whether the request is from the authorized host or from an unauthorized host; in response to determining that the request is from the authorized host, grant the request; and in response to determining that the request is from an unauthorized host, deny the request.

In some embodiments, the storage area comprises a controller memory buffer in the controller.

In some embodiments, the storage area comprises a persistent memory region in non-volatile memory of the storage system.

In some embodiments, the non-volatile memory comprises a three-dimensional memory.

In some embodiments, the request is a direct access request comprising a physical address of the storage area.

In some embodiments, the request is an indirect access request comprising a pointer to the storage area.

In some embodiments, determining whether the request is from the authorized host or from an unauthorized host comprises comparing an identifier of a host sending the request with an identifier of the storage area.

In some embodiments, the database further comprises one or more of the following: a physical region page (PRP) list, a scatter/gather list (SQL) segment, and a data buffer.

In some embodiments, the storage system is configured to be integrated in the authorized host.

In some embodiments, the storage system is configured to be removably connected with the authorized host.

In another embodiment, a method for secure host access to a controller memory buffer in a storage system is provided that is performed in a storage system comprising a controller with a controller memory buffer, wherein the controller memory buffer stores a database comprising a submission queue and a completion queue dedicated for use by an authorized host. The method comprises receiving a request to access the database in the controller memory buffer; determining whether the request is from the authorized host; and in response to determining that the request is from the authorized host, providing access to the database in the controller memory buffer.

In some embodiments, the request is a direct access request comprising a physical address of the controller memory buffer.

In some embodiments, the request is an indirect access request comprising a pointer to the controller memory buffer.

In some embodiments, determining whether the request is from the authorized host comprises comparing an identifier of a host sending the request with an identifier of the controller memory buffer.

In some embodiments, the database further comprises one or more of the following: a physical region page (PRP) list, a scatter/gather list (SGL) segment, and a data buffer.

In another embodiment, a storage system is provided comprising: a storage area configured to store a database comprising a submission queue and a completion queue dedicated for use by an authorized host; means for receiving a request to access the database; means for determining whether the request is from the authorized host; and means for, in response to determining that the request is from the authorized host, providing access to the database.

In some embodiments, the request is a direct access request comprising a physical address of the storage area.

In some embodiments, the request is an indirect access request comprising a pointer to the storage area.

In some embodiments, the database further comprises one or more of the following: a physical region page (PRP) list, a scatter/gather list (SQL) segment, and a data buffer.

In some embodiments, the storage system is configured to be integrated in the host.

Other embodiments are possible, and each of the embodiments can be used alone or together in combination. Accordingly, various embodiments will now be described with reference to the attached drawings.

Embodiments

Figures 1A, 1B:
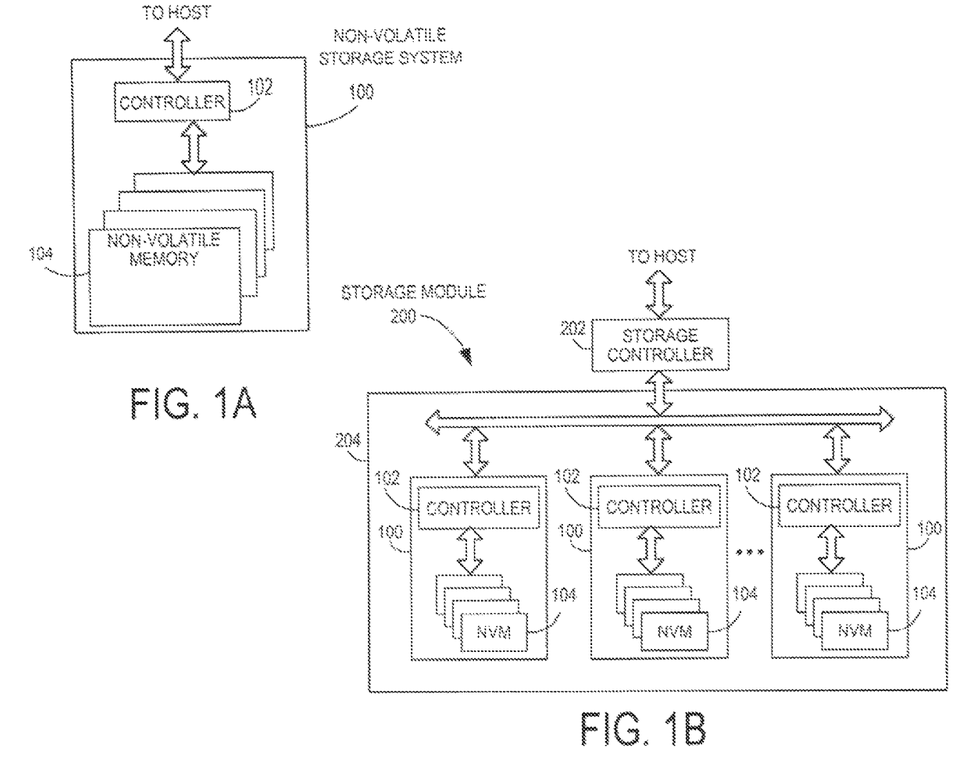
FIG. 1A is a block diagram of a non-volatile storage system of an embodiment.
FIG. 1B is a block diagram illustrating a storage module of an embodiment.
Figure 1C:
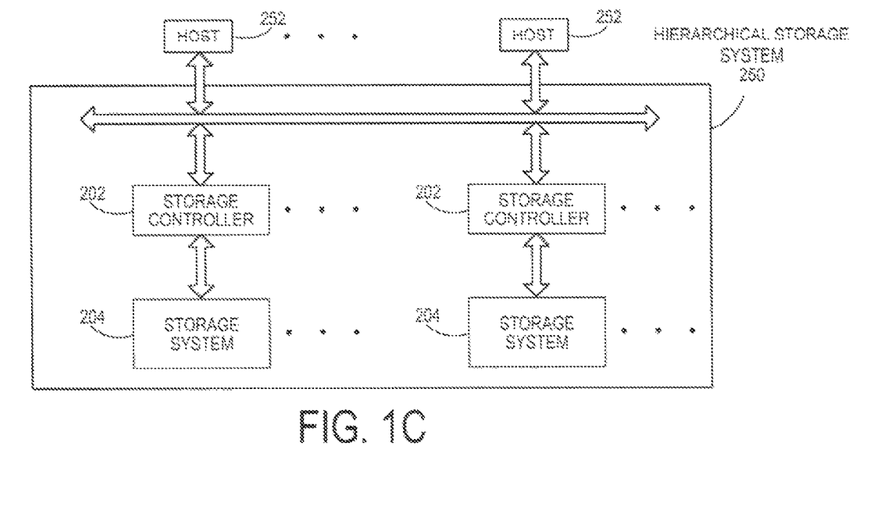
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
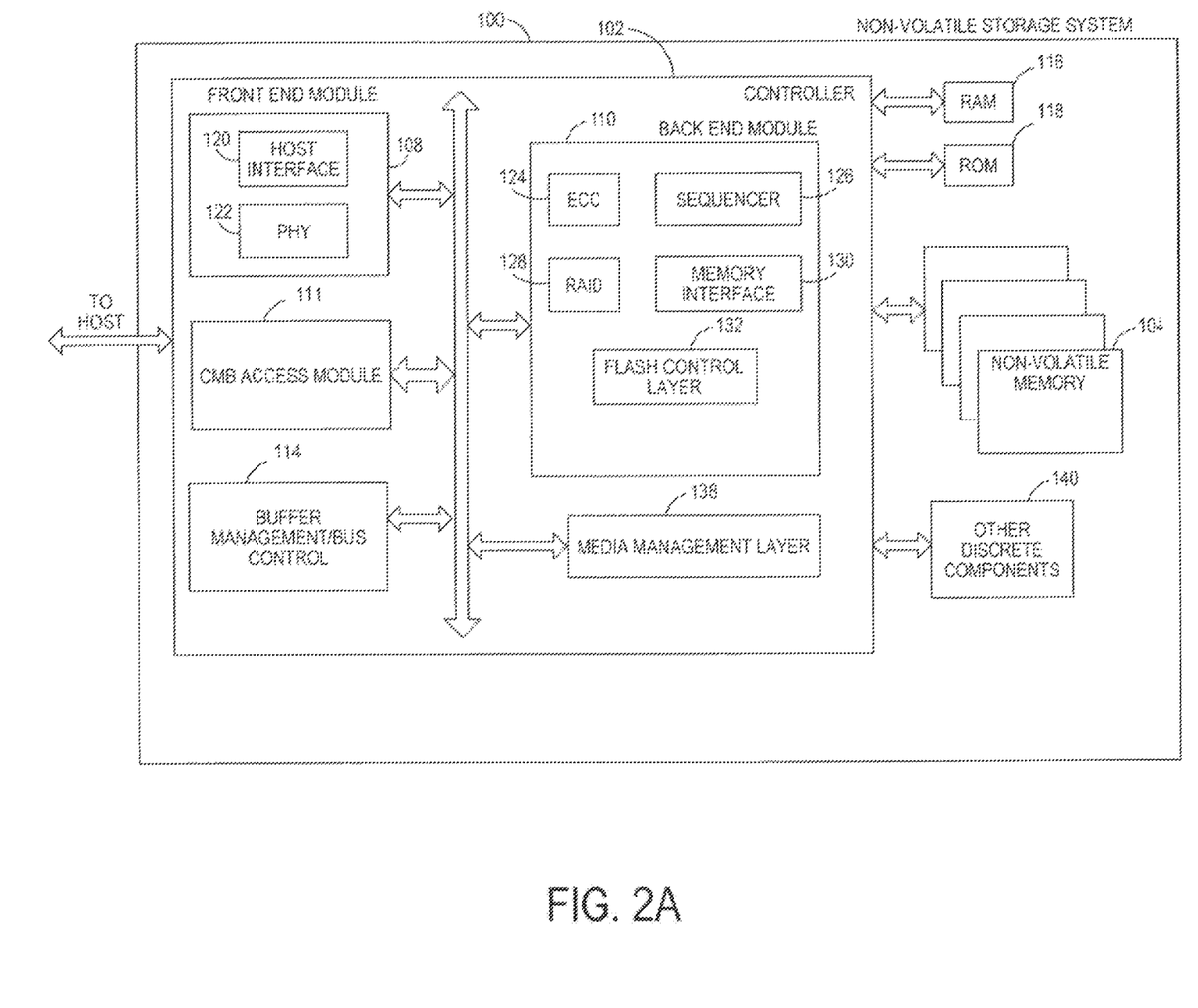
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a controller buffer memory (CMB) access module 111, which is discussed in more detail below, and can be implemented in hardware or software/firmware. The CMB access module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
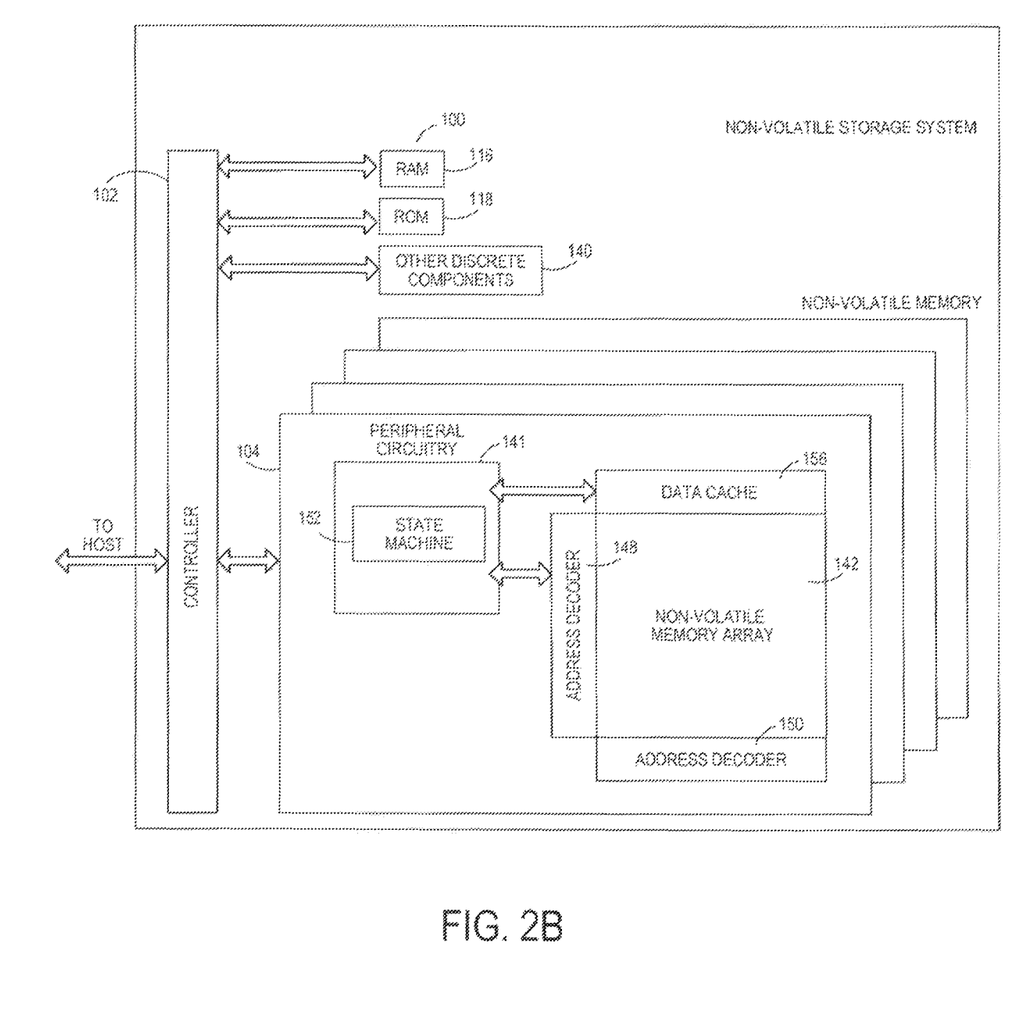
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

The storage system (sometimes referred to herein as the storage device or device) 100 can be used with any suitable protocol or specification. One such specification is the Non-Volatile Memory Express (NVMe) specification. NVMe is based on a paired submission queue (SQ) and completion queue (CQ). The host, using host software, places commands into a respective submission queue. The memory device 100, via the memory device controller 102, places entries on the associated completion queue, with the entries indicative of completed execution of commands.

In general, submission and completion queues are allocated in host memory while each queue might be physically located contiguously or non-contiguously in the host memory. However, the controller memory buffer (CMB) feature enables the host to place submission queues, completion queues, physical region page (PRP) lists, scatter/gather list (SGL) segments, and data buffers in the memory of the controller 102 of the storage system 100.

The persistent memory region (PMR) is an optional region of general purpose read/write persistent memory that may be used for a variety of purposes. The address range of the PMR is defined by a Peripheral Component Interconnect (PCI) base address register (BAR) and consumes the entire address region exposed by the BAR. The PMR supports the required features of the PCI Express programming model (i.e., without restricting what is otherwise permitted by PCI Express). The contents of the PMR persist across PMR disables, controller and non-volatile memory (NVM) subsystem resets, and power cycles.

CMB/PMR is a hot topic in the enterprise market for the next generation since this feature has a direct impact on performance especially in a PCI Express fabric topology. In addition, it reduces the amount of storage that is implemented in the host dynamic random access memory (DRAM).

The latest NVMe standard (version 1.3) introduces the NVMe virtualization environment. Virtualized environments may use an NVM subsystem with multiple controllers to provide virtual or physical hosts direct input/output (I/O) access. The NVM subsystem comprises primary controller(s) and secondary controller(s), where the secondary controller(s) depend on the primary controller(s) for dynamically-assigned resources. A host may issue an Identify command to a primary controller specifying the Secondary Controller List to discover the secondary controllers associated with that primary controller. In a virtualization environment, each primary and virtual function has its own CMB/PMR.

Unauthorized access is a potentially major problem for anyone who uses a computer or device, such as a smartphone or tablet. The consequences for victims of these break-ins can include the loss of valuable data, such as presentations, emails, and music. Victims may also have their bank account information, money, or even their identity stolen.

The following embodiments can be used to increase the security level of storage systems focusing on NVMe virtualization platforms. This provides the advantage of being able to provide security while protecting user data stored in the controller memory buffer being accessed by an unpermitted host. In NVMe virtualization platforms, multiple hosts interact with the storage system while each host is not aware about the other virtual hosts. These embodiments can be used to protect a dedicated database belonging to a specific host while denying access to the other hosts, such as when assigning functions to guests). More specifically, these embodiments provide a secured controller memory buffer path both in direct and indirect access flows. Using this concept, one virtual host will have access only for its own dedicated CMB/PMR database, and other virtual hosts will not have access to that database. In one embodiment, a specific CMB might be shared by several virtual machines (VMs), and, in this scenario, only the relevant VMs will have access to the CMB zone. Using these embodiments to protect user data stored in a controller memory buffer from being accessed by unpermitted host accesses may be desired in many environments, included enterprise and automotive environments.

The following paragraphs provide an illustration of one example of one embodiment. It should be noted that this is merely an example and other implementations can be used. Also, while the following paragraphs will be illustrated in terms of a CMB, it should be noted that these embodiments should not be limited to CMB and can be used additionally or instead with a PMR, for example.

In this example, the host may access the CMB in two modes. The first mode is direct access mode. In this mode, the host issues PCIe memory read and write transactions to the physical address of the CMB. Those transactions are directed to the relevant storage implemented in the storage device, and a completion may be sent to the host. The second mode is indirect access mode. In this mode, the host issues NVMe commands and queues them in the device. Those commands contain host pointers that could point to the CMB area. When issuing an NVMe write command, the storage device may fetch the data from the CMB and write the data to the media. For an NVMe read command, the storage device may read data from the media and write it to the CMB.

Figure 3:
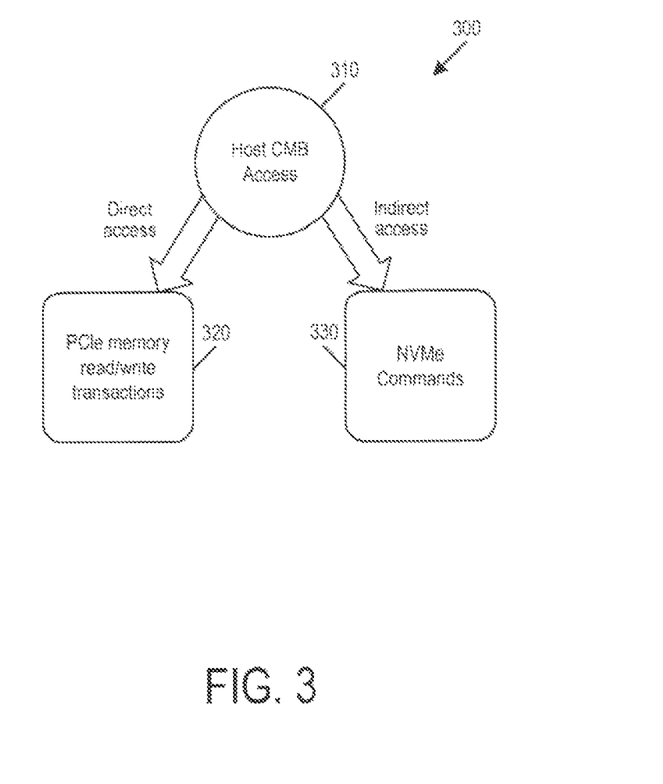
FIG. 3 is a diagram illustrating direct versus indirect controller memory buffer access of an embodiment.

The two CMB access modes are illustrated in the diagram 300 in FIG. 3. As shown in FIG. 3, there are two modes to access the host CMB (310). In direct access mode, there are PCIe memory read/write transactions (320), and, in indirect access mode, there are NMVe commands (330).

The following embodiments disclose a method that works in both direct and indirect access modes. With these embodiments, a storage device actively checks that each access to a CMB zone is accessed via an authorized virtual function. If that is not the case, the access is denied, and the relevant virtual functions may be reported about this violation (storage device may report this violation not only to the relevant virtual machine but also to the hypervisor).

In some embodiments, a CMB may not be dedicated to a single virtual machine, but it might be shared by several virtual machines. In this scenario, at the initialization phase, the hypervisor may notify the device about the access permissions, and the device acts accordingly. This can be done through a vendor-specific command or a set-feature command.

Figure 4:
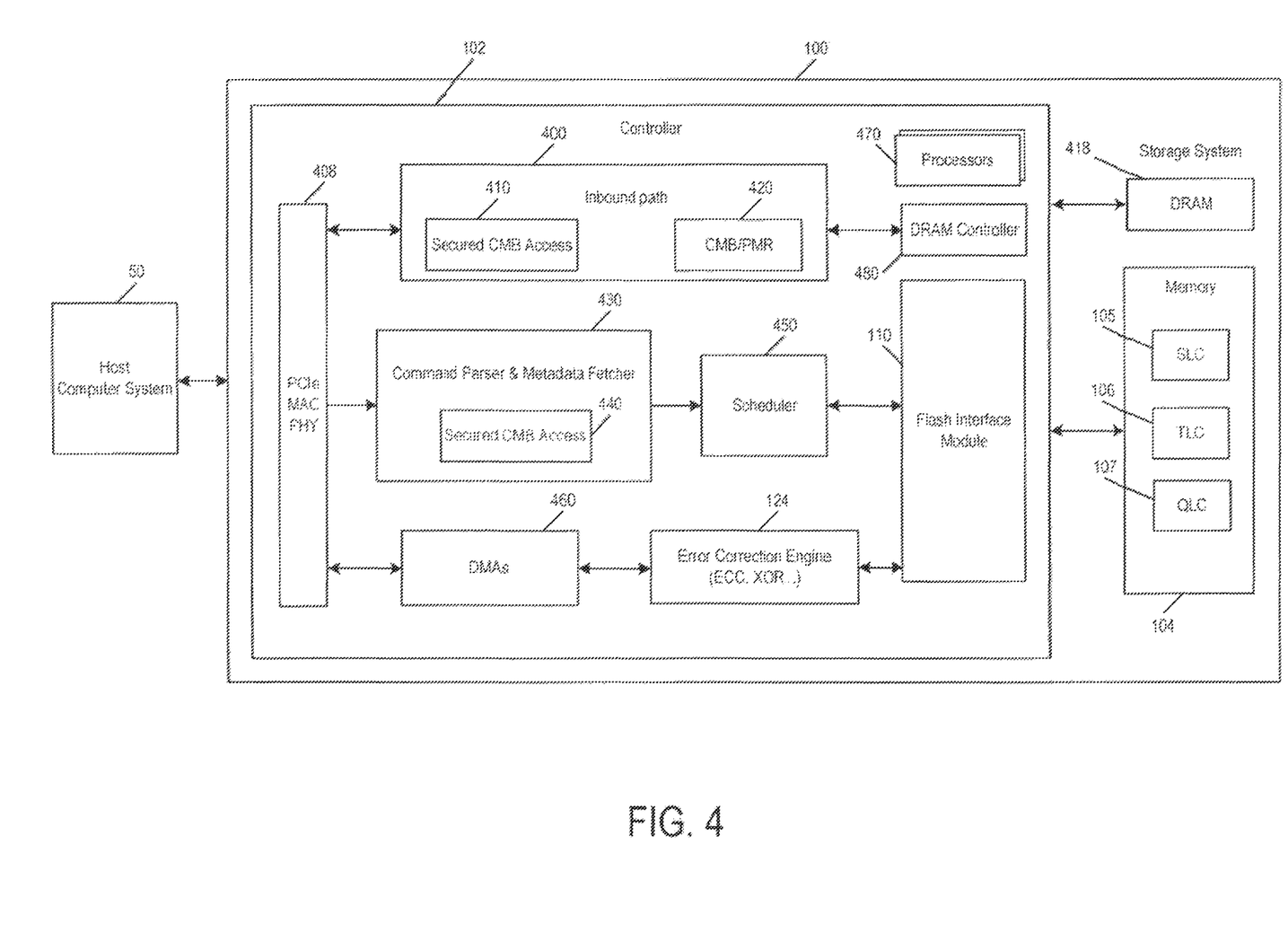
FIG. 4 is a block diagram of a storage system of an embodiment.

FIG. 4 presents a high-level block diagram of a storage system 100 of an embodiment in communication with a host 50, The host 50 can take any suitable form, such as, but not limited to, a personal computer, a mainframe computer, a server, or another computing device. To simplify the drawings, FIG. 4 does not show the various components that can be included in the host, such as, but not limited to, host memory having several zones (e.g., SQ, CQ, data buffers, and data PRP lists). The host 50 communicates with the storage system 100 using one or more busses. The bus communicates between a storage system interface (not shown) in the host 50 and the PCIe MAC PHY 408 in the controller 102 of the storage system 100, "PHY" is an abbreviation for the physical layer and refers to the circuitry used to implement physical layer functions. The PHY can connect a link layer device called a MAC (media access control) to a physical medium, such as a wire, cable, or fiber. There are many protocols defined in the industry for this interface, such as, but not limited to, Peripheral Component Interconnect Express (PCIe), SATA, and NVMe. The MAC and PHY can implement three low protocol layers (Transaction layer, Data Link layer, and Physical layer).

While the MAC PHY 408 is the interface between the controller 102 and the host 50, the flash interface module 110 is the interface between the controller 102 and the memory arrays 104. In general, the flash interface module (FIM) 110 is responsible for low-level interaction with the memory 104, which can include, for example, single-level cells (SLC) 105, triple-level cells (TLC) 106, and quad-level cells (QLC) 107. While flash is used in this example, it should be noted that other memory technologies can be used, which is why FIG. 2A refers to a "memory interface" instead of the more specific "flash interface module."

As shown in FIG. 4, there are several components between the MAC PHY 408 and the flash interface module 110. In this embodiment, those components include an inbound path 400 comprising a secured CMB access module 410 and a CMB/PMR 420. The submission/completion queues, PRP list, SGL segments, and data buffers may be implemented in CMB 420. The controller 102 also comprises a command parser and metadata fetcher 430 comprising a secured CMB access module 440, a scheduler 450, direct memory access modules (DMAs) 460, processors 470, an error correction module 124, and a DRAM controller 480 in communication with DRAM 418 in the storage system 100. Again, this is just an example implementation, and other implementations can be used.

The command parser and metadata fetcher 430 is responsible for fetching and parsing the commands from the host 50 and internally queuing them. For example, the command parser and metadata fetcher 430 can receive a command, parses it, and check the correctness of the command. The command parser and metadata fetcher 430 can also be responsible for controlling the flow of data between the controller 102 and the memory 104 by ordering requests or commands in a queue. The order may be based on priority of the request, availability of resources to handle the request, an address needed for the request, the age of the request, or access history of the requestor. In this way, the queue can be used to enable the delay of command execution, either in order of priority, on a first-in first-out basis, or in any other order. Instead of waiting for each command to be executed before sending the next one, the command parser and metadata fetcher 430 can just put the commands in the queue and can perform other processes while the queue is executed. In operation, the command parser and metadata fetcher 430 gets commands from the host 50, makes sure the command is ok, and can classify the command as a read or write command. As noted by its name, the command parser and metadata fetcher 430 can also identify metadata in a command.

The scheduler 450 is responsible for scheduling data transfers and control paths and for arbitrating and executing commands while activating the control path for fetching PRPs, posting completion and interrupts, and activating the DMAs 460 for the actual data transfer between the host 50 and the device 100. For example, read data might arrive from different memory arrays in parallel. The scheduler 450 can arbitrate between them and activate the DMAs 460, which are responsible for the data transfer between the host 50 and the memory 104. The error correction module 124 is responsible for error detection and correction and can decode and encode data read from and written to the memory 104.

The inbound path 400 is responsible for handling the direct CMB/PMR 420 transactions. Before issuing any transaction, the secured CMB access module 410 is responsible for making sure there are no security issues while one host accesses the database associated with another host. The secured CMB access module 440 implemented in the command parser and metadata fetcher 430 is responsible for the same functionality but when host commands are accessing the CMB 420.

Direct CMB Access

In direct CMB access mode, the host 50 issues PCIe memory read and write transactions to the physical address of the CMB 420. Those transactions are directed to the relevant storage implemented in the storage device 100, and a completion may be send to the host 50.

Figure 5:
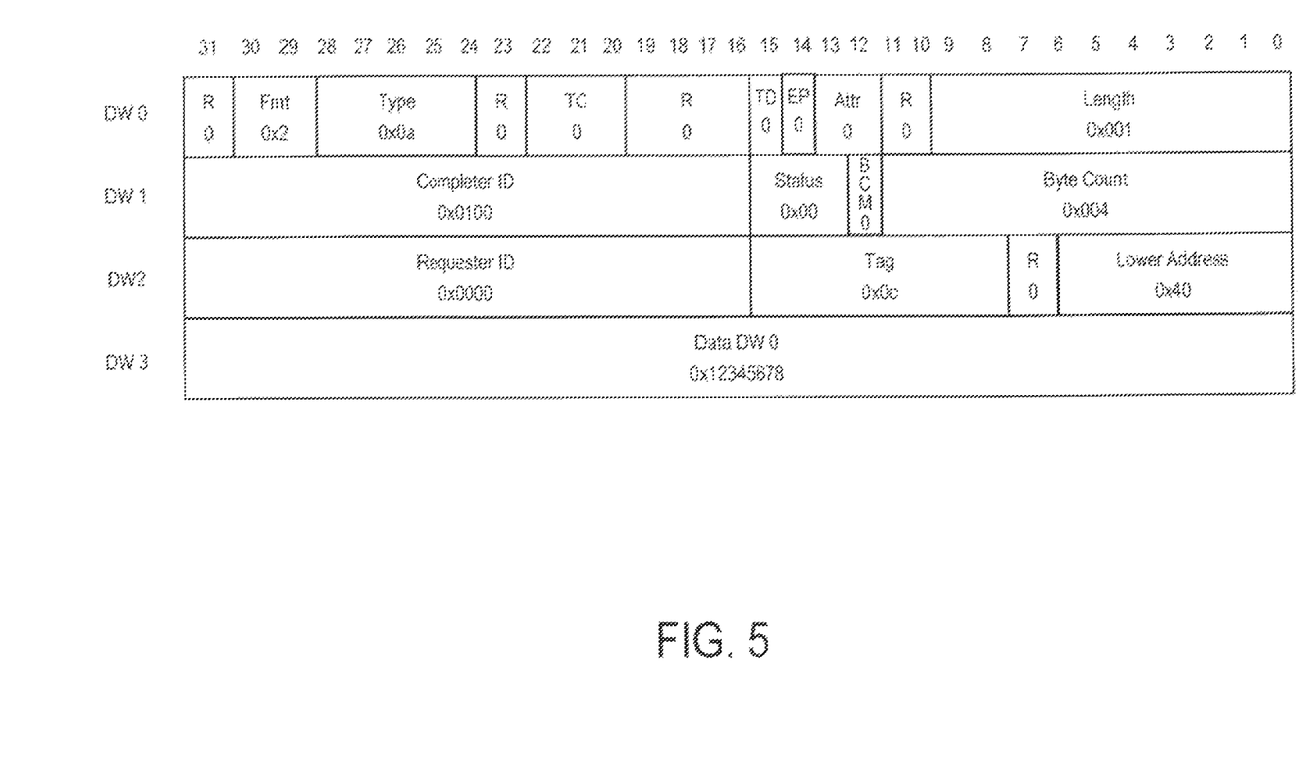
FIG. 5 is an illustration of a Peripheral Component interconnect Express (PCIe) translation layer packet structure of an embodiment.

FIG. 5 illustrates the structure of the PCIe translation layer packet (TLP). The TLP includes the requester identifier (ID). Parsing this field allows the device 100 to detect the ID of the requester. The TLP also contains the physical address that this transaction should be directed to. Using this physical address, the device 100 can calculate the CMB 420 required for the transaction.

Figure 6:
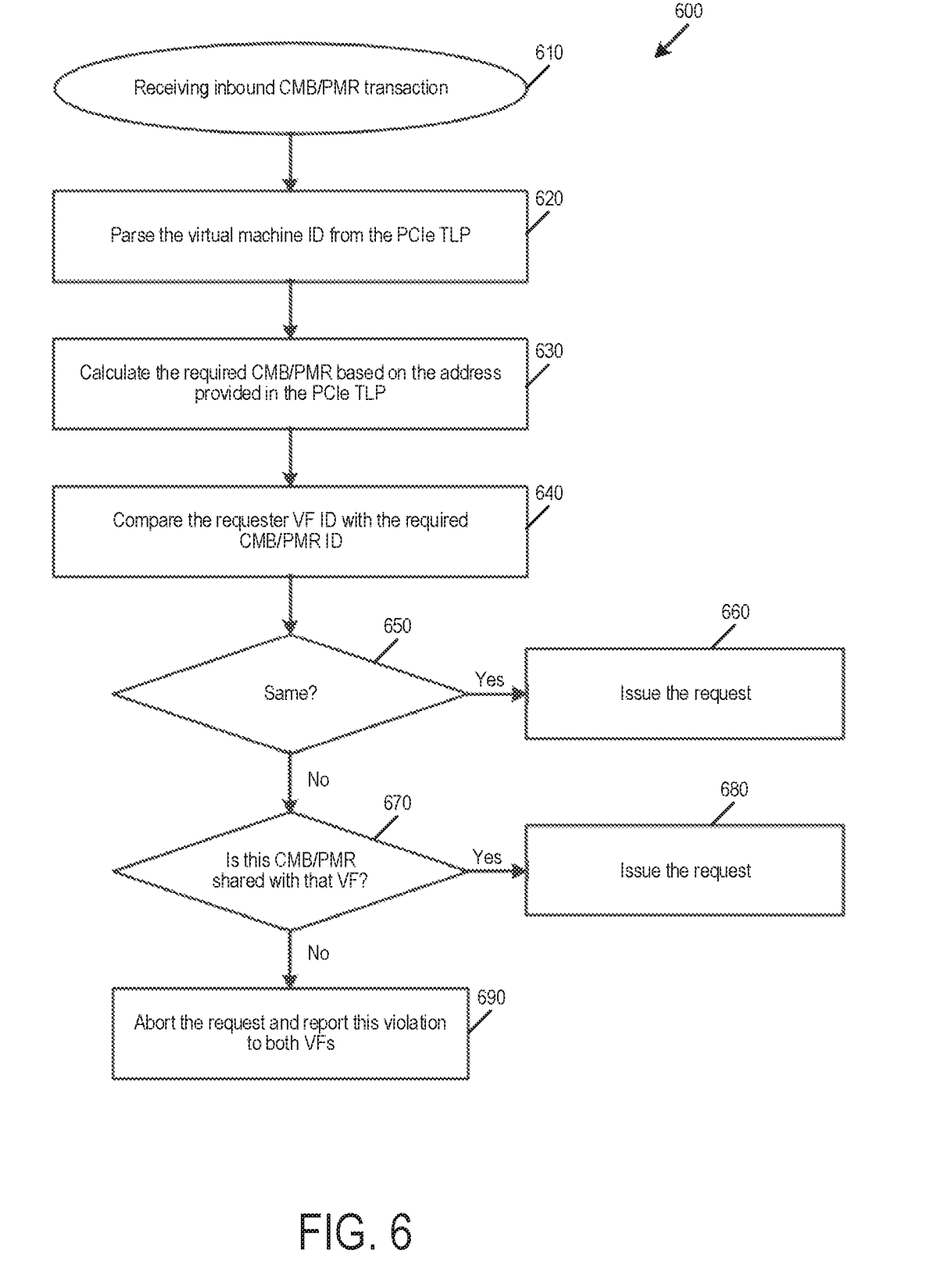
FIG. 6 is a flowchart of a method of an embodiment for controller memory buffer direct access.

FIG. 6 depicts a flowchart 600 that summarizes the steps implemented by the storage device 100 in this embodiment when receiving a direct CMB request. This embodiment assumes that the ID of the virtual machine is in the Requester ID field. In some environments, host virtual machine ID may not be uniquely available in the Requester ID. In that situation, the root complex/hypervisor may translate or may have done some internal mapping, but the assumption here is that the ID will be available so that we can do a comparison with a pre-set authorized ID and determine if the secure access is allowed or not.

As shown in FIG. 6, after the storage device 100 receives an inbound CMB/PMR transaction (act 610), the storage device 100 parses the virtual machine (VM) ID from the PCIe TLP using the requester ID field (act 620). Additionally, the storage device 100 calculates the required CMB 420 based on the physical address provided in the TLP (act 630) and compares those IDs (VM and CMB) to determine if they are the same (acts 640 and 650). If the IDs are the same, it means that requester VM is requesting access to its own dedicated CMB, and, therefore, the request is issued toward the CMB 420, and the request is issued (act 660). Otherwise, the storage device 100 checks whether this CMB 420 is shared by the requester VM at the initialization phase (act 670). If the required CMB 420 is indeed shared with the requester VM, the request is issued toward CMB 420 (act 680). Otherwise, the request is terminated, and both virtual hosts get a report about this event (act 690).

Indirect CMB Access:

In indirect CMB access mode, the host 50 issues NVMe commands and queues them in the device 100. Those commands contain host pointers that could point to the CMB area. When issuing an NVMe write command, the storage device 100 may fetch the data from the CMB 420 and writes the data to the media 104. For NVMe read commands, the storage device 100 may read the data from the media 104 and write it to the CMB 420.

Figure 7:
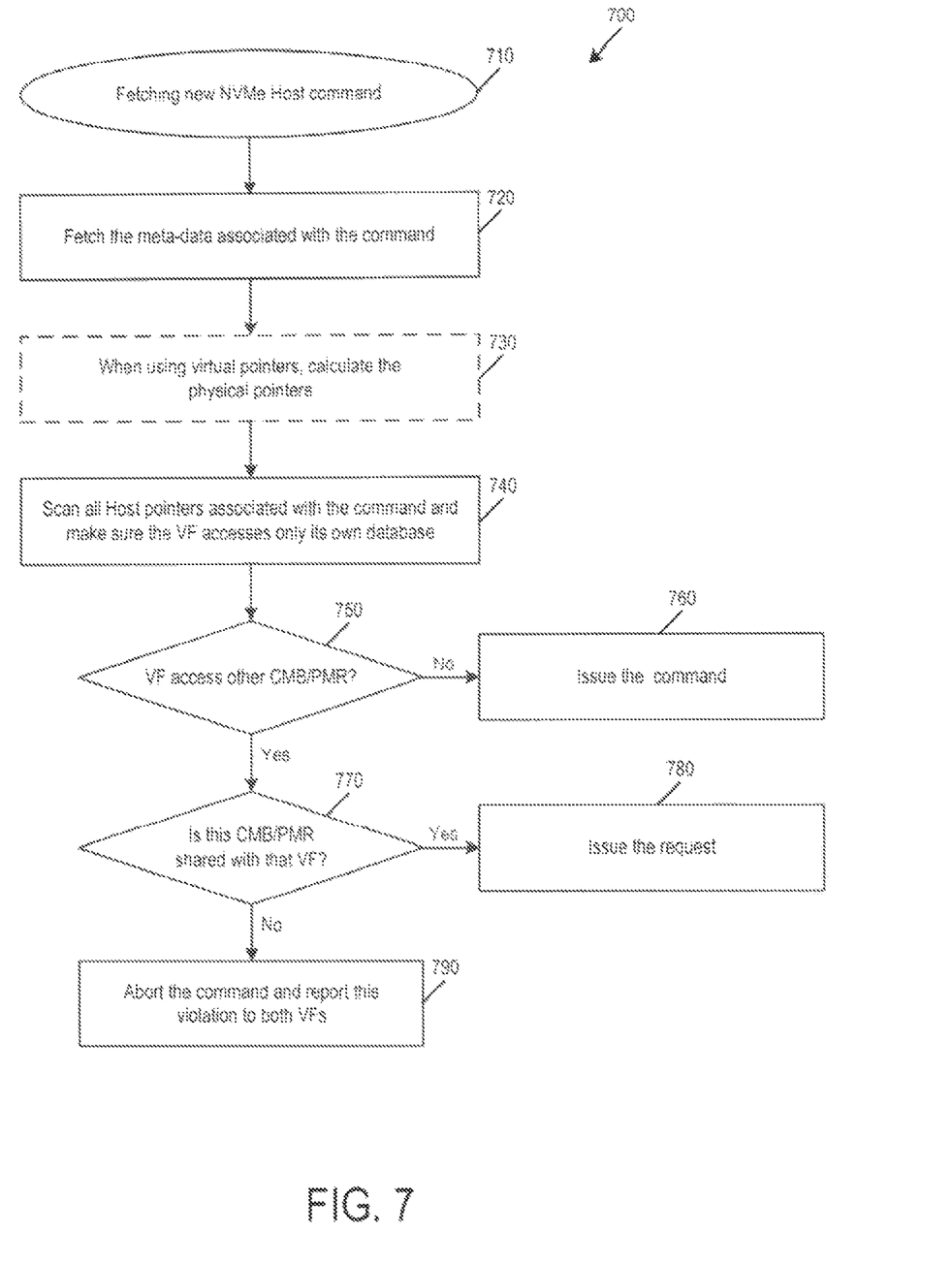
FIG. 7 is a flowchart of a method of an embodiment for controller memory buffer indirect access.

FIG. 7 depicts a flowchart 700 that summarizes the steps implemented by the storage device 100 when receiving an indirect CMB request through an NVMe command. The flow starts by fetching a new NVMe host command (act 710). Then, the storage device 100 fetches the metadata associated with the command (act 720). That can include the host pointers provided by the PRP or SGL method. Optionally, the storage device 100 can convert the host pointers represented in the virtual domain to the physical domain as detailed below (act 730).

Next, the storage device 100 scans all host pointers associated with the command (act 740). The storage device 100 makes sure that the command issued by a specific VM tries to access only host memory or the CMB/PMR 420 associated with that VM (act 750). If this is the case, the command starts the execution phase (act 760). Otherwise, the storage device 100 checks whether the required CMB for this command is shared by the requester VM at the initialization phase (act 770). If this is the case, the command starts the execution phase (act 780). Otherwise, the command is terminated, and both virtual hosts get a report about this event (act 790).

Figure 8:
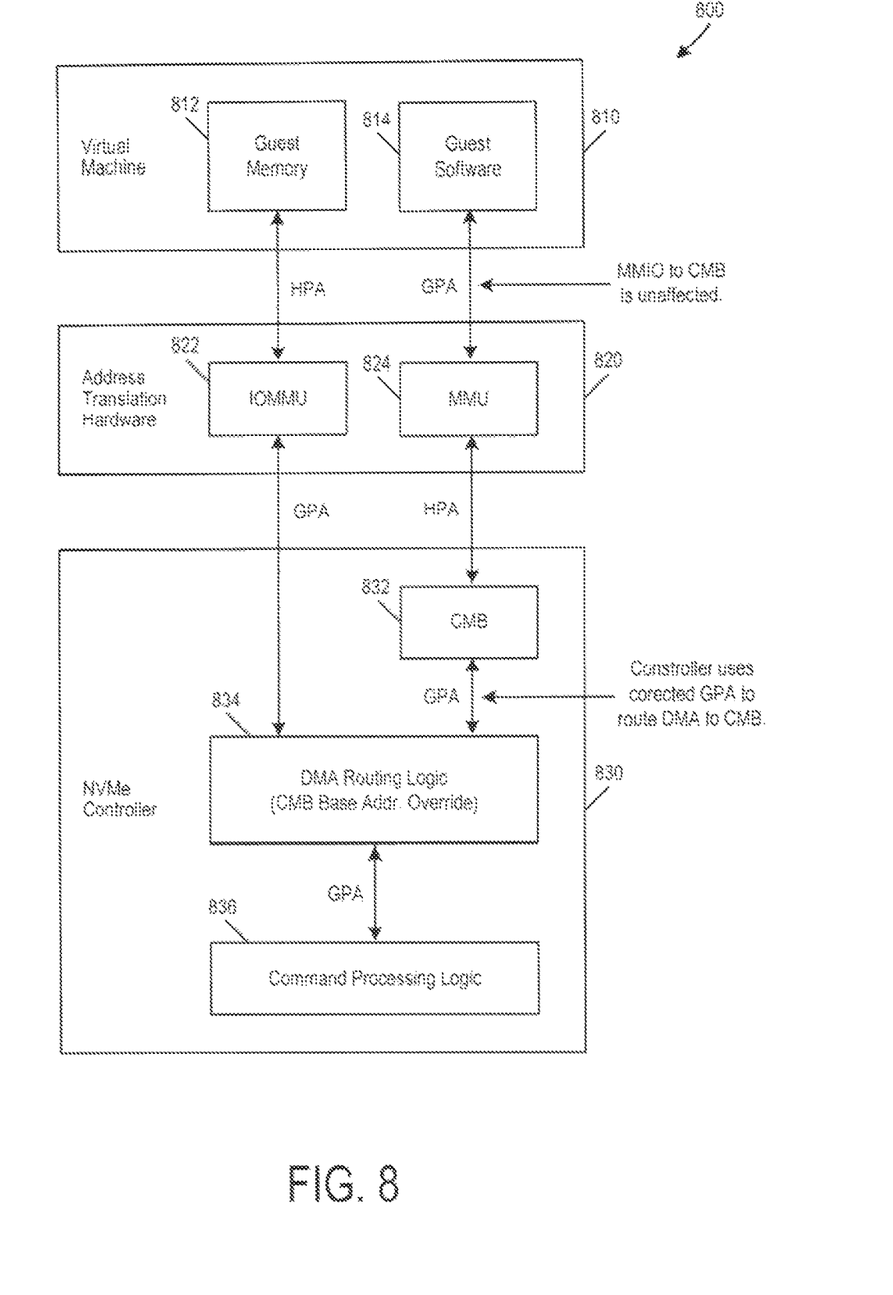
FIG. 8 is a flowchart of a method of an embodiment for controller memory buffer direct access.

FIG. 8 depicts another embodiment 800 when host pointers provided to the device 100 via the NVMe commands are in the virtual domain and not on the physical domain. As shown in FIG. 8, this embodiment 800 comprises a virtual machine 810 with guest memory 812 and guest software 814, address translation hardware 820 with an input-output memory management unit (IOMMU) 822 and a memory management unit (MMU) 824, and a controller 830 comprising a CMB 832, DMA routing logic (CMB base address override) 834, and command processing logic 836.

In this embodiment, the controller 830 is direct-assigned to a guest virtual machine 810 while the guest 810 sees a different Guest Physical Address (GPA) in the CMB/PMR 832 than the actual Host Physical Address (HPA). The Guest 810 supplies the GPA for the DMA of SQ, CQ, read/write data, and PRP/SGL for both system memory and the CMB/PMR 832. The controller 830 uses the HPA from the CMB/PMR when deciding how to route DMA.

In this embodiment, the storage device 100 first needs to have the CMB and host pointers in the same domain, so the mechanism disclosed above can be used. Some hypervisors implement a system in which the GPA is equal to the HPA. Others implement systems that allow the storage device 100 to get the physical pointers.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the Memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for secure host access to a controller memory buffer in a storage system, the method comprising:
performing the following in a storage system comprising a controller with a controller memory buffer that is shared by a plurality of virtual machines, wherein the controller memory buffer stores a plurality of data structures, each data structure dedicated to a different virtual machine of the plurality of virtual machines and storing a submission queue and a completion queue of the virtual machine to which the data structure is dedicated:
receiving, from one virtual machine of the plurality of virtual machines, a request comprising an identifier of the one virtual machine and an address;
identifying one data structure of the plurality of data structures from the address in the request;
comparing the identifier of the one virtual machine with an identifier of the one data structure;
in response to the identifier of the one virtual machine matching the identifier of the one data structure, allowing the one virtual machine to access the one data structure; and
in response to the identifier of the one virtual machine not matching the identifier of the one data structure:
determining whether the one data structure is shared with the one virtual machine;
in response to determining that the one data structure is shared with the one virtual machine, allowing the one virtual machine to access the one data structure; and
in response to determining that the one data structure is not shared with the one virtual machine, denying the one virtual machine access to the one data structure.

2. The method of claim 1, wherein the request is a direct access request.

3. The method of claim 1, wherein the request is an indirect access request.

4. The method of claim 1, wherein each data structure of the plurality of data structures is further configured to store a physical region page (PRP) list.

5. The method of claim 1, wherein the plurality of data structures comprises a plurality of databases.

6. The method of claim 1, wherein each of the plurality of data structures is further configured to store a scatter/gather list (SGL) segment.

7. The method of claim 1, wherein each of the plurality of data structures is further configured to store a data buffer.

8. A storage system comprising:
a memory configured to be shared by a plurality of virtual machines, the memory configured to store a plurality of data structures, each data structure dedicated to a different virtual machine of the plurality of virtual machines and storing a submission queue and a completion queue of the virtual machine to which the data structure is dedicated; and
a controller configured to:
receive, from one virtual machine of the plurality of virtual machines, a request comprising an identifier of the one virtual machine and an address;
identify one data structure of the plurality of data structures from the address in the request;
compare the identifier of the one virtual machine with an identifier of the one data structure;
in response to the identifier of the one virtual machine matching the identifier of the one data structure, allow the one virtual machine to access the one data structure; and
in response to the identifier of the one virtual machine not matching the identifier of the one data structure:
determine whether the one data structure is shared with the one virtual machine;
in response to determining that the one data structure is shared with the one virtual machine, allow the one virtual machine to access the one data structure; and
in response to determining that the one data structure is not shared with the one virtual machine, deny the one virtual machine access to the one data structure.

9. The storage system of claim 8, wherein the memory comprises a controller memory buffer in the controller.

10. The storage system of claim 8, wherein the memory comprises a persistent memory region in non-volatile memory of the storage system.

11. The storage system of claim 10, wherein the non-volatile memory comprises a three-dimensional memory.

12. The storage system of claim 8, wherein the request is a direct access request.

13. The storage system of claim 8, wherein the request is an indirect access request.

14. The storage system of claim 8, wherein each data structure of the plurality of data structures further stores a physical region page (PRP) list.

15. The storage system of claim 8, wherein the storage system is configured to be integrated in a host comprising the plurality of virtual machines.

16. The storage system of claim 8, wherein the storage system is configured to be removably connected with a host comprising the plurality of virtual machines.

17. The storage system of claim 8, wherein the plurality of data structures comprises a plurality of databases.

18. The storage system of claim 8, wherein each data structure of the plurality of data structures further stores a scatter/gather list (SGL) segment.

19. The storage system of claim 8, wherein each data structure of the plurality of data structures further stores a data buffer.

20. A storage system comprising:
a memory configured to be shared by a plurality of virtual machines, the memory configured to store a plurality of data structures, each data structure dedicated to a different virtual machine of the plurality of virtual machines and storing a submission queue and a completion queue of the virtual machine to which the data structure is dedicated;
means for receiving, from one virtual machine of the plurality of virtual machines, a request comprising an identifier of the one virtual machine and an address;
means for comparing the identifier of the one virtual machine with an identifier of a data structure;

means for allowing the one virtual machine access to the data structure in response to the identifier of the one virtual machine matching the identifier of the data structure; and means for in response to the identifier of the one virtual machine not matching the identifier of the data structure:
- determining whether the data structure is shared with the one virtual machine;
- in response to determining that the data structure is shared with the one virtual machine, allowing the one virtual machine to access the data structure; and
- in response to determining that the data structure is not shared with the one virtual machine, denying the one virtual machine access to the data structure.

* * * * *